United States Patent
Schroeder et al.

(10) Patent No.: US 7,129,947 B1
(45) Date of Patent: Oct. 31, 2006

(54) USE OF NORMAL MESHES IN THREE-DIMENSIONAL IMAGING

(75) Inventors: Peter Schroeder, Pasadena, CA (US); Igor Guskov, South Pasadena, CA (US); Wim Sweldens, New Providence, NJ (US)

(73) Assignee: California Institute of Technology, Pasadena, CA (US)

( * ) Notice: Subject to any disclaimer, the term of this patent is extended or adjusted under 35 U.S.C. 154(b) by 1148 days.

(21) Appl. No.: 09/820,383

(22) Filed: Jul. 26, 2000

(51) Int. Cl.
*G06T 15/00* (2006.01)
(52) U.S. Cl. ........................ 345/428; 345/441; 345/581
(58) Field of Classification Search ................ 345/418, 345/419, 421, 423, 424, 426, 427, 428, 581, 345/420, 582, 586, 440–442, 619
See application file for complete search history.

(56) References Cited

U.S. PATENT DOCUMENTS

| 5,555,356 | A | | 9/1996 | Scheibl |
| 6,046,744 | A | | 4/2000 | Hoppe |
| 6,108,006 | A | | 8/2000 | Hoppe |
| 6,208,997 | B1 | * | 3/2001 | Sigeti et al. ............. 707/104.1 |
| 2001/0002131 | A1 | * | 5/2001 | DeRose et al. ............. 345/423 |

* cited by examiner

*Primary Examiner*—Phu K. Nguyen
(74) *Attorney, Agent, or Firm*—Howrey LLP

(57) ABSTRACT

A special set of normal meshes is defined where errors and residuals will also be along a direction that minimizes the error in coding. These normal meshes can be used to model a three dimensional surface.

2 Claims, 5 Drawing Sheets

USE OF NORMAL MESHES IN THREE-DIMENSIONAL IMAGING

BACKGROUND

Three-dimensional imaging often requires three scalar functions such as x, y, and z coordinates. These coordinates define parameters of the surface so that the surface can be visualized as a three dimensional image.

SUMMARY

The present application teaches a new kind of way of describing a three dimensional surface. The description is called a "normal mesh". The mesh has information which defines information relative to a special tangent plane.

In one embodiment, the normal mesh is defined as a normal offset from a coarser version. The mesh can be stored with a single float per vertex, thus reducing the amount of information which needs to be stored.

BRIEF DESCRIPTION OF THE DRAWINGS

These and other aspects will now be described in detail with reference to the accompanying drawings, in which.

DETAILED DESCRIPTION

Figure 1:
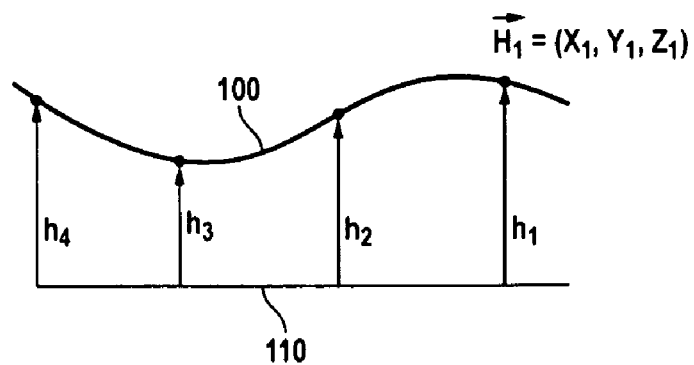
FIG. 1 shows how a smooth surface of three dimensions can be described in terms of single variable scalars.

FIG. 1 shows how a smooth surface 100 can be locally described by single variable scalar height functions, $h_1$, $h_2$, $h_3$, $h_4$ over a tangent plane 110. When considered this way, the three dimensional information for the smooth surface 100 is contained only in this single dimension h: the height over the tangent plane. In practice, this approximation only works infinitesimally. However, it may provide interesting information.

Surfaces are often approximated using a triangle mesh. However, this description may lose structural assumption that are inherent in the actual surface. For example, some of the smoothness assumption that one can make in an actual surface may be lost in the triangle mesh. Hence, the triangle mesh has inherent redundancy.

For a given smooth shape, different parameterizations may still keep the geometry the same. In defining a mesh, the present application notices that infinitesimal tangential motion of a vertex does not change the geometry. However, moving in the normal direction does change the geometry.

The normal meshes which are described herein require only a single scalar value per vertex. This is may be done using a multiresolution and local frame. A hierarchical representation provides that all detail coefficients expressed in these frames are scalar. The parameter may be a normal component, for example. In the context of compression, for example, this allows parameter information to be predicted and confines residual error to the normal direction.

A curve in a plane can be defined by a pair of parametric functions.

$S(t)=(x(t),y(t))$ with $t\in[0,1]$. In the present embodiment, polylines may be used to approximate curves.

Let $l(p,p')$ be the linear segment between the points p and p'. A polyline multiresolution approximation is made by sampling the curve at points $s_{j,k}$ where $s_{j,k}=s_{j+1,2k}$ and defining the jth level approximation as $$L_j = \bigcup_{0 \le k < 2^j} l(S_{j,k}, S_{j,k+1})$$

Figure 2:
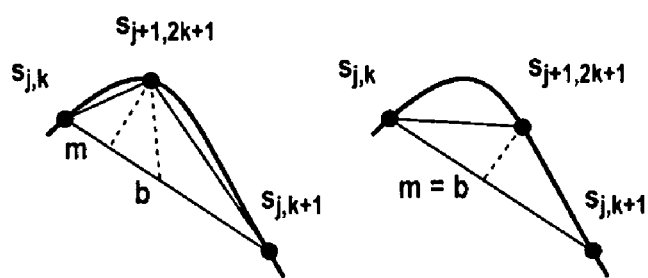
FIG. 2 shows a polyline.

To move from $L_j$ to $L_{j+1}$, the points $s_{j+1,2k+1}$ are inserted (FIG. 2, left). Clearly this requires two scalars: the two coordinates of $s_{j+1,2k+1}$. Alternatively one could compute the difference $s_{j+1,2k+1}-m$ between the new point and some predicted point m, for example, the midpoint of the neighboring points $s_{j,k}$ and $s_{j,k+1}$. This detail has a tangential component m−b and a normal component $b-s_{j+1,2k+1}$. The normal component represents the geometric information while the tangential component the parameter information.

FIG. 2 shows removing one point ($S_{(j+1,2k+1)}$) in a polyline multiresolution and recording the difference with the midpoint m. On the left a general polyline where the detail has both a normal and a tangential component. On the right is a normal polyline where the detail is purely normal.

Polylines can hence be described with one scalar per point if the parameter information is always zero, i.e., b=m, in FIG. 2B. If the triangle $s_{j,k}$, $s_{j+1,2k+1}$, $s_{j,k+1}$ is Isosceles, there is no parameter information.

Hence a polyline is "normal" if a multiresolution structure exists where every removed point forms an Isosceles triangle with its neighbors. Then there is zero parameter information and the polyline can be represented with one scalar per point, namely the normal component of the associated detail.

Figure 3:
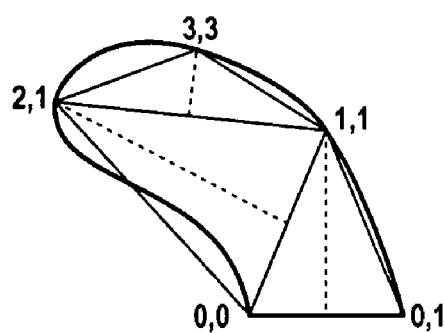
FIG. 3 shows construction of a normal polyline.

FIG. 3 shows construction of a normal polyline. We start with the coarsest level and each time check where the normal to the midpoint crosses the curve. For simplicity only the indices of the $s_{j,k}$ points are shown and only certain segments are subdivided. The polyline (0,0)-(2,1)-(3,3)-(1,1)-(0,1) is determined by its endpoints and three scalars, the heights of the Isosceles triangles.

For a general polyline, the removed triangles are hardly ever exactly Isosceles, and the polyline hence not normal. A normal polyline approximation for any continuous curve using the following techniques. The easiest is to start building Isosceles triangles from the coarsest level. The operation starts with the first base $l(s_{0,0}, s_{0,1})$, see FIG. 3. Next, its midpoint is taken. A determination is made of where the normal direction crosses the curve. Because the curve is continuous, there has to be at least one such point. If there are multiple points, any one point can be selected. This point can be labeled as $s_{1,1}$. The first triangle is defined using this point. Now this process is repeated. Each time $s_{j+1,2k+1}$ is found where the normal to the midpoint of $s_{j,k}$ and $s_{j,k+1}$ crosses the curve. Thus any continuous curve can be approximated arbitrarily closely with a normal polyline. The result is a series of polylines $L_j$, all of which are normal with respect to midpoint prediction. Effectively each level is parameterized with respect to the one coarser level. Because the polylines are normal, only a single scalar value, the normal component, needs to be recorded for each point. These polylines may have no parameter information.

One can also consider normal polylines with respect to other predictors. A base point and normal estimate can be produced using the well known 4 point rule. Any predictor which only depends on the coarser level is allowed. Irregular schemes described in Daubechies, I., Guskov, I., and Sweldens, W. Regularity of Irregular Subdivision. Constr. Approx. 15 (1999), 381–426. can also be used. Levels may be built by downsampling every other point, or using any other ordering.

Describing this in terms of further generality, a polyline is normal if a removal order of the points exist such that each removed point lies in the normal direction from a base point, where the normal direction and base point only depend on the remaining points.

Hence a normal polyline may be completely determined by a single scalar component per vertex.

Normal polylines are closely related to certain well known fractal curves such as the Koch Snowflake. The normal coefficients can be thought of as a piecewise linear wavelet transform of the original curve. Because the tangential components are always zero, there may be half as many wavelet coefficients as the original scalar coefficients. The wavelets have their usual decorrelation properties.

A triangle mesh M is a pair (P,K), where P is a set of N point positions $P=\{P_i=(X_i,Y_i,Z_i)\epsilon R^3 \mid 1 \leq i \leq N\}$, and K is an abstract simplicial complex which contains all the topological, i.e., adjacency information. The complex K is a set of subsets of $\{1, \ldots ,N\}$. These subsets come in three types: vertices {i}, edges {i,j}, and faces {i,j,k}. Two vertices i and j are neighbors if $\{i,j\}\epsilon E$. The 1-ring neighbors of a vertex I form a set $V(i)=\{j/mid\{i,j\}\epsilon E\}$.

Definition of normal triangle meshes may be inspired by the curve case. Consider a hierarchy of triangle meshes $M_j$ built using mesh simplification with vertex removals. These meshes are nested in the sense that $P_j \subset P_{j+1}$. Take a removed vertex $P_i \epsilon P_{j+1} \backslash P_j$. For the mesh to be normal we need to be able to find a base point $^b$ and normal direction N that only depend on $P_j$, so that $P_i^{-b}$ lies in the direction N. This leads to the definition that a mesh M is normal in case a sequence of vertex removals exists so that each removed vertex lies on a line defined by a base point and normal direction which only depends on the remaining vertices.

Thus a normal mesh can be described by a small base domain and one scalar coefficient per vertex.

Figure 4A:
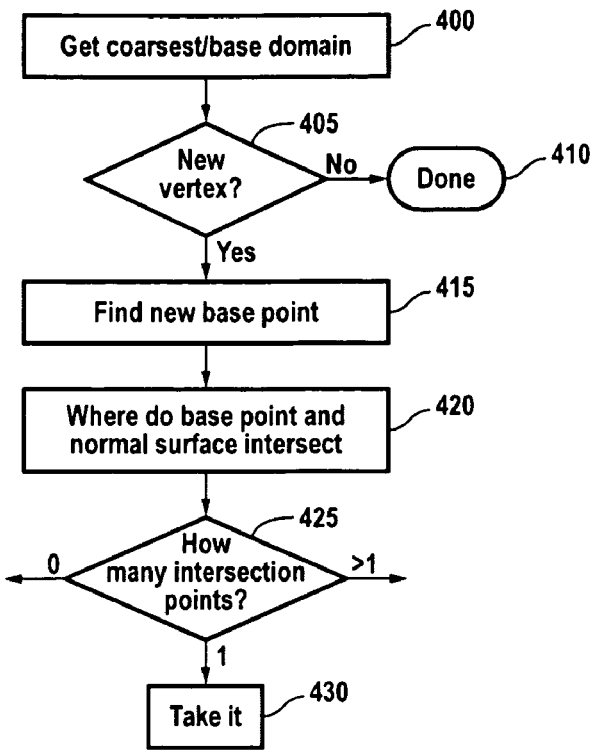
FIG. 4A shows a flowchart of forming a polyline.

A mesh in general is not normal, just as a curve is in general not normal. The present application therefore uses a special kind of mesh, called a semi-regular mesh. The semi-regular mesh has a connectivity which is formed by successive quadrasection of coarse base domain faces. The operation is shown in FIG. 4 at 440, the operation begins with a coarsest level or base domain. If there are no new vertices, the operation is complete at 410. For each new vertex determined at 405, a new base point is computed and a normal direction are found at 415. A determination is made of where the line defined by the base point and normal intersects the surface 420. 425 determines how many intersection points exist. If only one point exists, it is accepted at 430. In the surface situation, there might be no intersection point or many intersection points, not all of which are correct.

If there are no intersection points, control passes to the left. A fully normal mesh could not be built from this base domain. Therefore, the definition of a normal mesh is rearranged to allow a small number of cases where the new points do not lie in the normal direction. The technique needs to find a suitable non-normal direction in order to proceed.

A smooth parameterization helps define the surface. Several parameterization techniques have been proposed including MAPS, patch wise relaxation, and specific smoothness function, see, Dyn, N., Levin, D., and Gregory, J. A. A Butterfly Subdivision Scheme for Surface Interpolation with Tension Control. ACM Transactions on Graphics 9, 2 (1990), 160–169. Eck, M., DeRose, T., Duchamp, T., Hoppe, H., Lounsbery, M., and Stuetzle, W. Multiresolution Analysis of Arbitrary Meshes. Proceedings of SIGGRAPH 95 (1995), 173–182. Lee, A. W. F., Dobkin, D., Sweldens, W., and Schröder, P. Multiresolution Mesh Morphing. Proceedings of SIGGRAPH 99 (1999), 343–350; Levoy, M. The Digital Michelangelo Project. In Proceedings of the 2nd International Conference on 3D Digital Imaging and Modeling, October 1999.

Consider a region R of the mesh homeomorphic to a disc that is to be parameterized onto a convex planar region B, i.e., find a bijective map $u:R \rightarrow B$. The map u is fixed by a boundary condition $\partial R \rightarrow \partial B$ and minimizes a certain energy functional. Several functionals can be used leading to, e.g., conformal or harmonic mappings. The disclosed system takes an approach based on the parameterization scheme introduced by Floater. In short, the function u needs to satisfy the following equation in the interior:

$$u(Pi) = \sum_{k \in V(i)} \alpha_{ik} u(Pk), \qquad (1)$$

where V(i) is the 1-ring neighborhood of the vertex i and the weights $\alpha_{ik}$ come from the Floater parameterization scheme introduced by Floater. The Floater weights is that they are always positive, which, combined with the convexity of the parametric region, guarantees that no triangle flipping can occur within the parametric domain. This is not true in general for harmonic maps which can have negative weights. The iterative biconjugate gradient method is used to obtain the solution to the system.

Figure 4B:
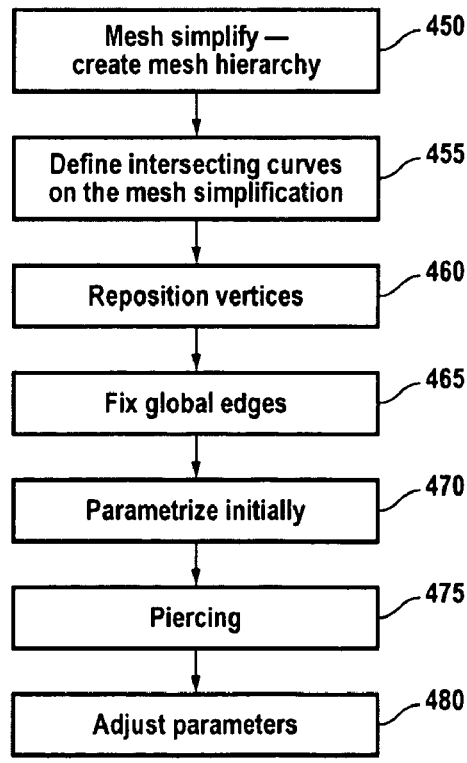
FIG. 4B shows a flowchart of overall operation of compressing the surface.

The overall image formation is shown in the flowchart of FIG. 4B. FIG. 5 shows a highly detailed and curved model of a molecule and these steps.

Figure 5A:
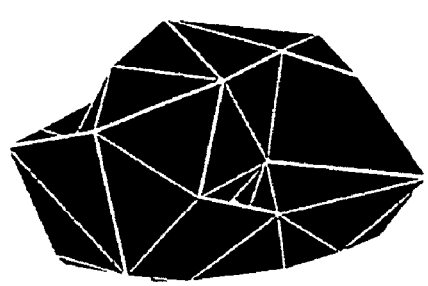
FIGS. 5A–5F show the various stages of compressing a sample surface, here a molecule.

1. Mesh simplification: At 450, the Garland-Heckbert simplification, based on half-edge collapses, is used to create a mesh hierarchy $(P_j,K_j)$. We use the coarsest level $(P_0,K_0)$ as an initial guess for our base domain $(Q_0,K_0)$. The first image, shown in FIG. 5A, shows an image of the base domain for the molecule. Note that this is relatively coarse.

Figure 5B:
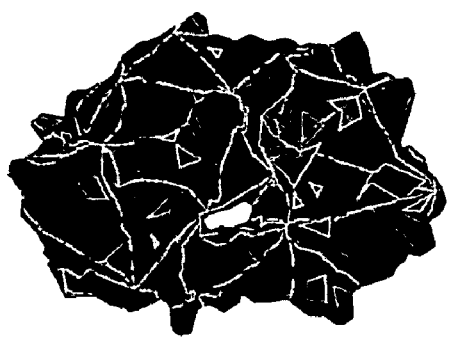

2. Building an initial net of curves: At 460, an initial set of curves is defined, to connect the vertices of the base domain with a net of non intersecting curves on the different levels of the mesh simplification hierarchy. This can be done using the MAPS parameterization. MAPS uses polar maps to build a bijection between a 1-ring and its retriangulation after the center vertex is removed. The concatenation of these maps is a bijective mapping between different levels $(P_j,K_j)$ in the hierarchy. The desired curves include the image of the base domain edges under this mapping. Because of the bijection, no intersection can occur. Note that the curves start and finish at a vertex of the base domain. They need not follow the edges of the finer triangulation, i.e., they can cut across triangles. These curves define a network of triangular shaped patches corresponding to the base domain triangles. Later these curves will be adjusted on some intermediate level. Again MAPS may be used to propagate these changes to other levels. FIG. 5B shows these curves for some intermediate level of the hierarchy.

3. Fixing the global vertices: A normal mesh is almost completely determined by the base domain. Selection of the base domain vertices $Q_0$ may reduce the number of non-normal vertices to a minimum. The coarsest level of the mesh simplification $P_0$ is only a first guess.

At 460, the global vertices $q_i$ are respositioned with $\{i\} \epsilon K_0$. Constraint is imposed that the $q_i$ needs to coincide with some vertex $P_k$ of the original mesh, but not necessarily $p_i$.

The repositioning is typically done on some intermediate level j. Take a base domain vertex $q_i$ shown on the left in FIG. 6. We build a parameterization from the patches incident to vertex $q_i$ to a disk in the plane 610, see FIG. 6. Boundary conditions are assigned using arc length parameterization. Parameter coordinates are iteratively computed for each level j vertex inside the shaded region. The point $q_i$ may be replaced with any level point from $P_j$ in the shaded region. The new $q_{i'}$ may be the point of $P_j$ that in the parameter domain is closest to the center of the disk.

Once a new position $q_i'$ is chosen, the curves can be redrawn by taking the inverse mapping of straight lines from the new point in the parameter plane. This procedure may be iterated. It may alternatively suffice to cycle once through all base domain vertices.

User controlled repositioning may allow the user to replace the center vertex with any $P_j$ point in the shaded region. Parameterization may be used to recompute the curves from that point.

Figure 5C:
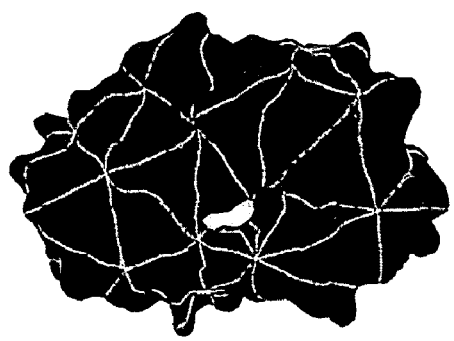

FIG. 5C shows the repositioned vertices. Notice how some of them, like the rightmost ones have moved considerably.

Figure 6:
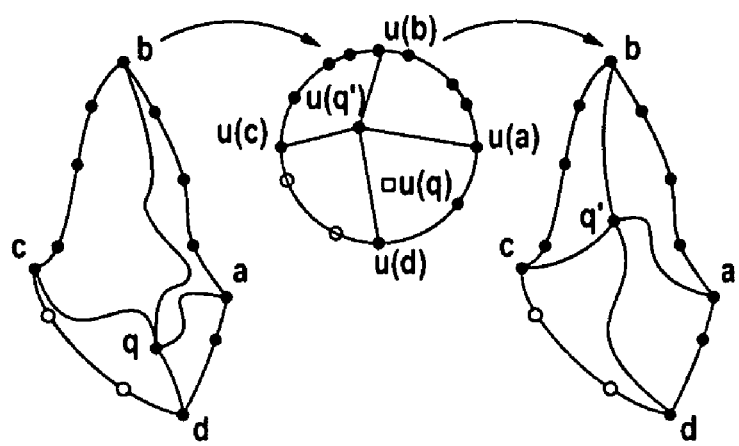
FIG. 6 shows a based domain vertext repositioning.

FIG. 6 shows base domain vertex repositioning with the left showing original patches around $q_i$, middle: parameter domain, right: repositioned $q_i$ and new patch boundaries. This is replaced with the vertex whose parameter coordinate are the closest to the center. The inverse mapping (right) is used to find the new position $q_i'$ and the new curves.

Figure 5D:
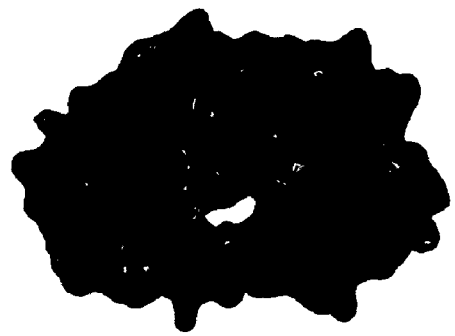
Figure 5E:
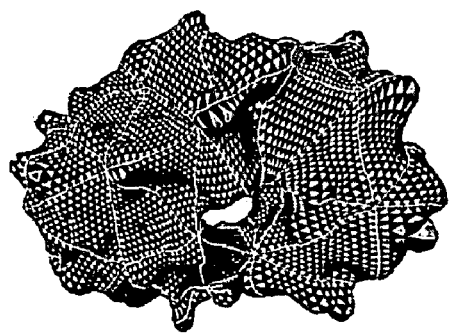
Figure 5F:
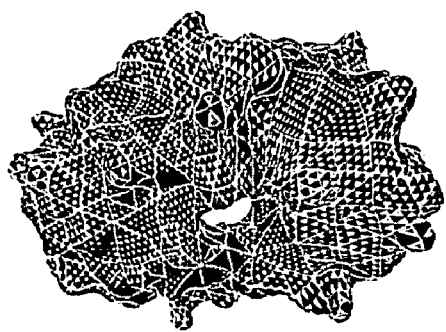

4. Fixing the global edges: The image of the global edges on the finest level will later be the patch boundaries of the normal mesh. For this reason, the smoothness of the associated curves be improved at the finest level. 465 defines fixing global edges using a procedure similar to Eck, M., DeRose, T., Duchamp, T., Hoppe, H., Lounsbery, M., and Stuetzle, W. Multiresolution Analysis of Arbitrary Meshes. Proceedings of SIGGRAPH 95 (1995), 173–182. For each base domain edge $\{i,k\}$ region formed on the finest level mesh by its two incident patches. Let l and m be the opposing global vertices. A scalar parameter function $\rho$ within the diamond-shaped region of the surface is compiled. The boundary condition is set as $\rho(q_i)=\rho(q_k)=0$, $\rho(q_l)=1$, $\rho(q_m)=-1$, with linear variation along the edges. The parameterization is compiled and its zero level set is the new curve. One could iterate this procedure until convergence but in practice one cycle may suffice. The curves of FIG. 5D represent the result of the curve smoothing on the finest level.

5. Initial parameterization: Once the global vertices and edges are fixed the interior may be filled at 470. This is done by computing parameterization of each patch to a triangle while keeping the boundary fixed. The parameter coordinates from the last stage can serve as a good initial guess a smooth global parameterization is shown in the bottom left of FIG. 5E. Each triangle is given a triangular checkerboard texture to illustrate the parameterization.

Figure 7:
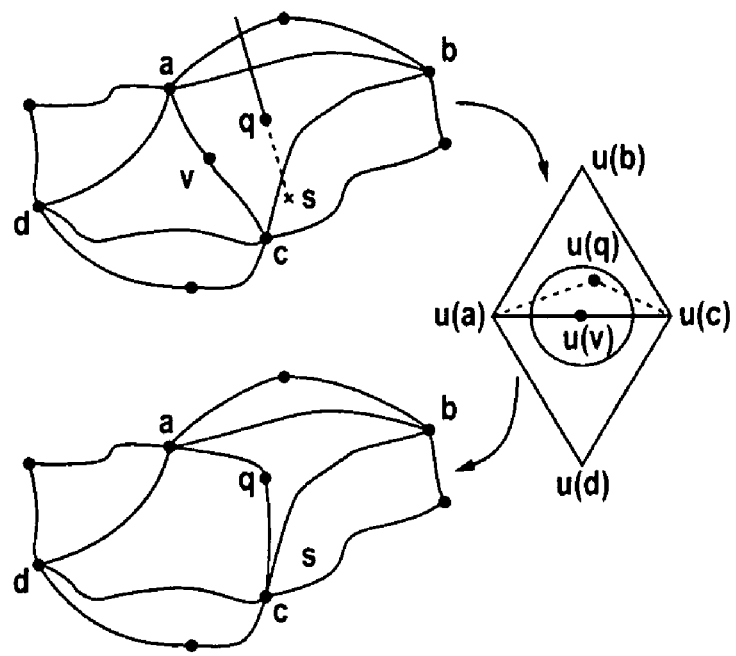
FIG. 7 shows a piercing operation.

FIG. 7 shows Upper left: piercing, the Butterfly point is s, the surface is pierced at the point q, the parametrically suggested point v lies on the curve separating two regions of the mesh. Right: parameter domain, the pierced point falls inside the aperture and gets accepted. Lower left: the parameterization is adjusted to let the curve pass through q.

6. Piercing: Piercing, at 475, piercing is used to start building the actual normal mesh. FIG. 7 shows the canonical step for a new vertex of the semi-regular mesh to find its position on the original mesh. In quadrisection, every edge of level j generates a new vertex on level j+1. First, compute a base point is computed using interpolating Butterfly subdivision as well as an approximation of the normal. This defines a straight line. This line may have multiple or no intersection points with the original surface. The new vertex q may lie halfway along the edge $\{a, c\}$ with incident triangles $\{a, c, b\}$ and $\{c, a, d\}$, see FIG. 7. Let the two incident patches form the region R.

Build the straight line L defined by the base point s predicted by the Butterfly subdivision rule and the direction of the normal computed from the coarser level points. All the intersection points of L are found with the region R by checking all triangles inside.

If there is no intersection the point v that lies midway between the points a and c in the parameter domain is taken: $u(v)=(u(a)+u(c))/2$. This is the same point a standard parameterization based remesher would use.

In the case when there exist several intersections of the mesh region R with the piercing line L we choose the intersection point that is closest to the point u(v) in the parameter domain. Let us denote by u(q) the parametric coordinates of that piercing point. We accept this point as a valid point of the semi-regular mesh if $$\|u(q)-u(v)\|<\kappa\|u(a)-u(v)\|,$$

where κ is an "aperture" parameter that specifies how much the parameter value of a pierced point is allowed to deviate from the center of the diamond. Otherwise, the piercing point is rejected and the mesh takes the point with the parameter value u(v).

7. Adjusting the parameterization: Once there is a new piercing point, we need to adjust the parameterization to reflect this at 480. Essentially, the adjusted parameterization u should be such that the piercing point has the parameters $u(v)=:u(q)$. When imposing such an isolated point constraint on the parameterization, there is no mathematical guarantee against flipping. Hence a new piecewise linear curve through u(q) in the parameter domain is prepared. This gives a new curve on the surface which passes through q, see FIG. 7. The parameterization for each of the patches onto a triangle is separately computed. A piecewise linear boundary condition, with the half point at q on the common edge, is produced.

Figure 8:
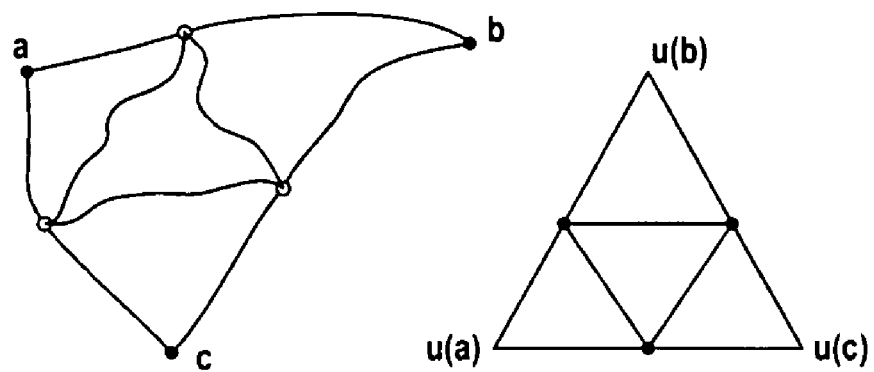
FIG. 8 shows a face splitting operation to obtain additional surface detail.

When all the new midpoints for the edges of a face of level j are computed, the faces of level j+1 are found. This is done by drawing three new curves inside the corresponding region of the original mesh, as shown in FIG. 8. Before that operation happens we need to ensure that a valid parameterization is available within the patch. The patch is parameterized onto a triangle with three piecewise linear boundary conditions each time putting the new points at the midpoint. Then the new points are connected in the parameter domain which allows us to draw new finer level curves on the original mesh. This produces a metamesh similar to  [14] which replicates the structure of the semi-regular hierarchy on the surface of the original. The construction of the semi-regular mesh can be done adaptively with the error driven procedure from MAPS [15]. An example of parameterization adjustment after two levels of adaptive subdivision is shown FIG. 5F**.

Figure 9:
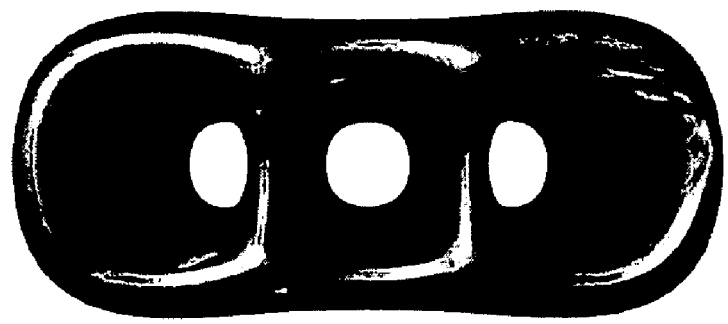
FIG. 9 shows a result of applying a naïve piercing procedure.

As the parametrization regions become smaller, the starting guesses are better and the solver becomes faster. Lazy parameter computation may be used, and the relaxation is run just before we actually need to use parameters for either a point location or a surface curve drawing procedure. FIG. 8 shows a Face split: Quadrisection in the parameter plane (left) leads to three new curves within the triangular surface region (right). The aperture parameter $\kappa$ of the piercing procedure provides control over how much of the original parameterization is preserved in the final mesh. At $\kappa=0$ a mesh can be built based entirely based on the original global parameterization. At $\kappa=1$ a purely normal mesh can be made which is independent of the parameterization. The best results may be achieved when the aperture was set low (0.2) at the coarsest levels, and then increased to (0.6) on finer levels. On the very fine levels of the hierarchy, where the geometry of the semi-regular meshes closely follows the original geometry, a naive piercing procedure without parameter adjustment. FIG. 9 illustrates such a Naive piercing procedure. Clearly, several regions have flipped triangles and are self-intersecting.

FIG. 9 shows 4 levels of naive piercing for the torus starting from a 102 vertex base mesh. Clearly, there are several regions with flipped and self-intersecting triangles. The error is about 20 times larger than the true normal mesh.

Normal meshes have numerous applications. The following are examples.

Compression Usually a wavelet transform of a standard mesh has three components which need to be quantized and encoded. Information theory tells us that the more non uniform the distribution of the coefficients the lower the first order entropy. Having ⅔ of the coefficients exactly zero will further reduce the bit budget. From an implementation viewpoint, the normal mesh coefficients may be connected to the best known scalar wavelet image compression code.

Filtering It has been shown that applications such as smoothing, enhancement, and denoising can simply be effected through a suitable scaling of wavelet coefficients. In a normal mesh any such algorithm will run three times as fast. Also large scaling coefficients in a standard mesh will introduce large tangential components leading to flipped triangles. In a normal mesh this is much less likely to happen.

Texturing Normal semi-regular meshes are very smooth inside patches, across global edges, and around global vertices even when the base domain is exceedingly coarse, cf. the skull model. The implied parameterizations are highly suitable for all types of mapping applications.

Rendering Normal maps are a very powerful tool for decoration and enhancement of otherwise smooth geometry. In particular in the context of bandwidth bottlenecks it is attractive to be able to download a normal map into hardware and only send smooth coefficient updates for the underlying geometry. The normal mesh transform effectively solves the associated inverse problem: construct a normal map for a given geometry.

Although only a few embodiments have been disclosed in detail above, other modifications are possible.

What is claimed is:

1. A method of forming a model of a three dimensional object, comprising:
    forming a coarsest version of the model;
    forming a plurality of curves which do not intersect one another, and which start and finish at vertices defining a base domain;
    determining non-normal vertices;
    repositioning said non-normal vertices to form a number of normal vertices; and
    forming a normal mesh based on the normal vertices.

2. A method as in claim 1, wherein the normal vertices are each defined in terms of one scalar per vertex.

* * * * *

UNITED STATES PATENT AND TRADEMARK OFFICE
CERTIFICATE OF CORRECTION

| | | |
|---|---|---|
| PATENT NO. | : 7,129,947 B1 | Page 1 of 1 |
| APPLICATION NO. | : 09/820383 | |
| DATED | : October 31, 2006 | |
| INVENTOR(S) | : Peter Schroeder et al. | |

It is certified that error appears in the above-identified patent and that said Letters Patent is hereby corrected as shown below:

Column 1, line 3, insert:
--The U.S. Government has certain rights in this invention pursuant to Grant Nos. ACI-9624957, ACI-9721349 & DMS-9872890 awarded by the National Science Foundation.--

Signed and Sealed this

Twenty-second Day of May, 2007

JON W. DUDAS
*Director of the United States Patent and Trademark Office*